Figure 10:
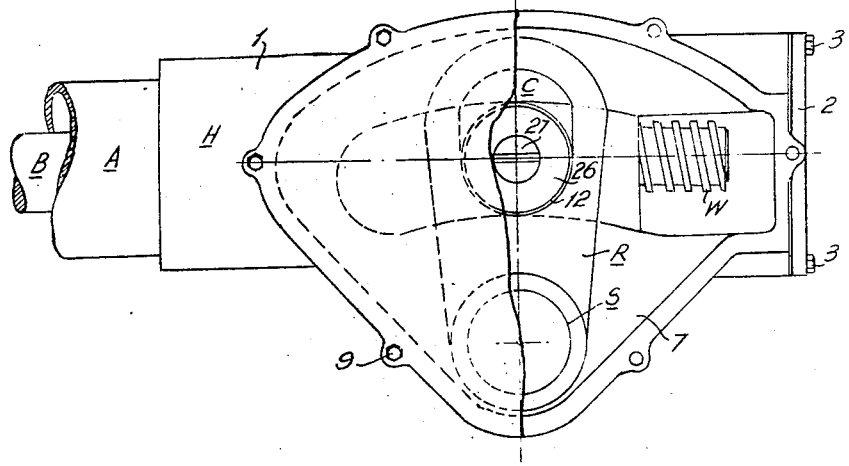

Nov. 29, 1949     A. P. MILL     2,489,534
NOW BY JUDICIAL CHANGE OF NAME
A. P. MILL COCHRANE
STEERING GEAR MECHANISM
Filed March 10, 1947     5 Sheets-Sheet 1
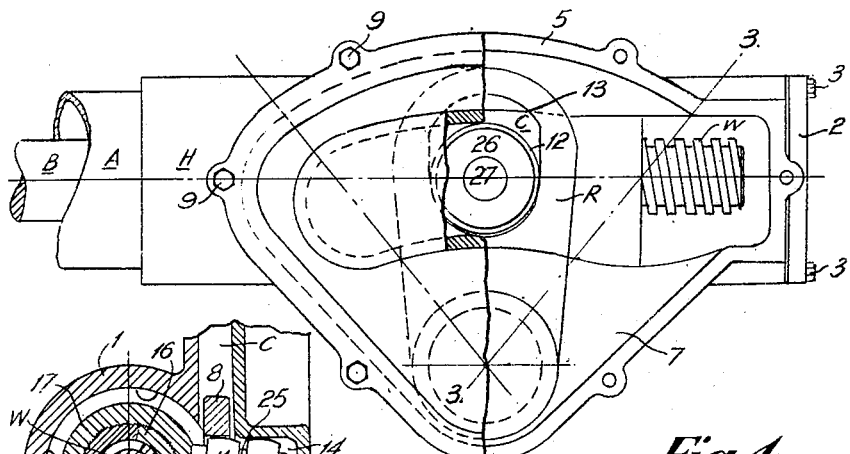
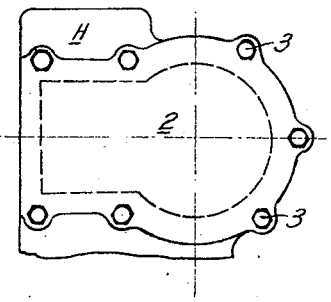
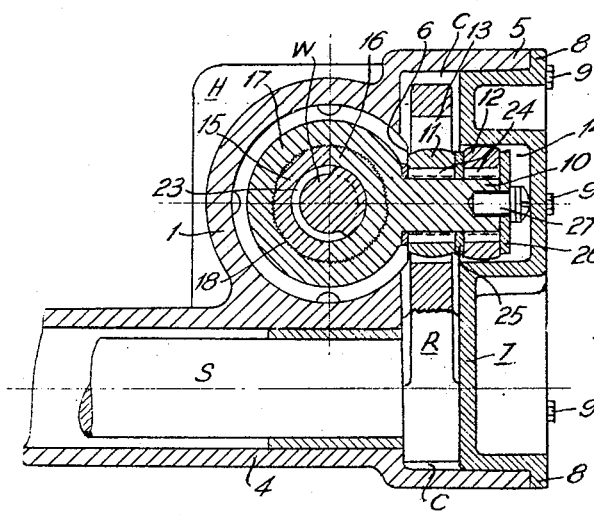

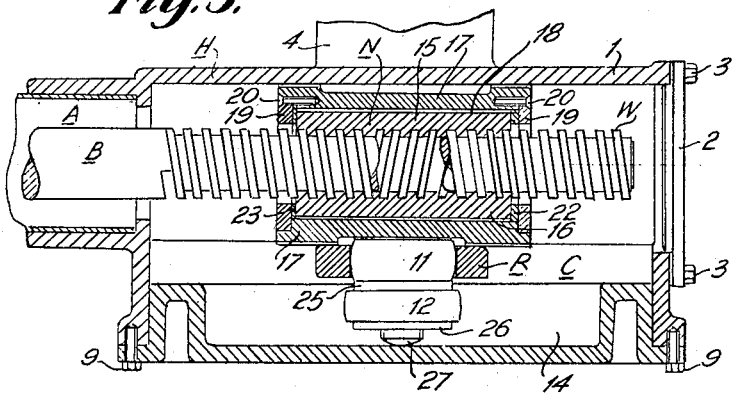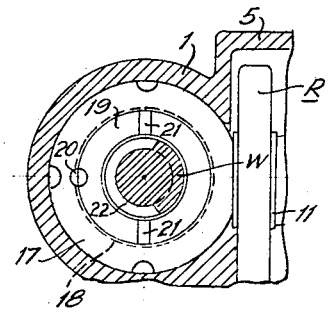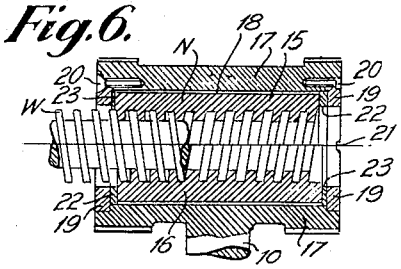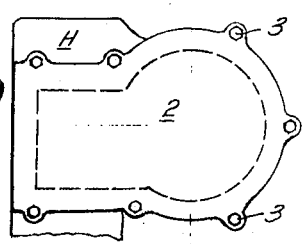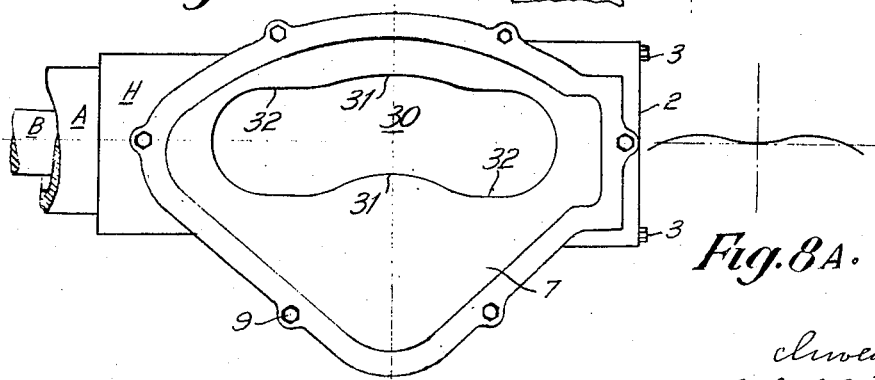

Nov. 29, 1949 A. P. MILL 2,489,534
NOW BY JUDICIAL CHANGE OF NAME
A. P. MILL COCHRANE
STEERING GEAR MECHANISM
Filed March 10, 1947 5 Sheets-Sheet 3

Nov. 29, 1949  A. P. MILL  2,489,534
NOW BY JUDICIAL CHANGE OF NAME
A. P. MILL COCHRANE
STEERING GEAR MECHANISM
Filed March 10, 1947  5 Sheets-Sheet 4

Inventor:
Alfred P. Mill
By his attorneys:
Baldwin & Wight

Nov. 29, 1949    A. P. MILL    2,489,534
NOW BY JUDICIAL CHANGE OF NAME
A. P. MILL COCHRANE
STEERING GEAR MECHANISM

Filed March 10, 1947

Patented Nov. 29, 1949

2,489,534

UNITED STATES PATENT OFFICE 2,489,534

STEERING GEAR MECHANISM

Alfred Paul Mill, Coulsdon, England, now by judicial change of name Alfred Paul Mill Cochrane Application March 10, 1947, Serial No. 733,632
In Great Britain October 23, 1945

Section 1, Public Law 690, August 8, 1946
Patent expires October 23, 1965

4 Claims. (Cl. 74—499)

1

This invention relates to steering mechanism of the type in which rotary movement of the steering column is translated into angular movement of the steering wheels by a nut or its equivalent travelling on a screw thread forming part of or connected to the steering column.

In existing types of mechanism the nut is operably connected to the steering wheels by a lever arm, the nut having a sliding contact with the arm which is forked or otherwise slotted to engage the nut.

In the mechanism of my invention which is the subject of my Patent 2,355,364, the nut carries a roller for co-operation with a guide, conveniently formed in the cover plate to the housing for the screw and nut gear.

The mechanical leverage exerted through the steering column on the road wheels is thus dependent on the path of the nut which in the construction just described is rectilinear being governed by the guide slot and the fact that the nut travels to and fro along the axis of the steering column. This arrangement secures an increased mechanical advantage corresponding to extreme lock positions and is effective in so far that it counteracts the added loading effect of axle castor.

In a similar form of steering mechanism where provision is made for the steering column to swing at the nut end, the nut describes a part circle corresponding to the arcuate movement of the lever arm, so that a nearly constant ratio gear action results.

The present invention aims at securing a variable gear ratio according to requirements of any particular front axle layout by varying the effective length of the lever arm according to its angular displacement from normal corresponding to head-on central position of the wheel.

According to the present invention, in a steering gear having nut and screw mechanism of the type set out, the nut is freely mounted on the column or screw associated therewith and is guided in its movements in relation to the rocker arm by means such as a roller member operating in a guideway, and whereby the point of contact between the nut and its rocker arm is controlled so as to vary the leverage exerted by the rocker arm to any required mechanical ratio.

It will be obvious that by suitably designing the guideway the track followed by the nut and thus the effective length of the lever arm may be caused to vary to give any mechanical ratio demanded by the front axle layout.

The nut is preferably provided with a pin carrying a roller for engagement with a guideway formed either by a slot in the housing wall through which it projects or in a channel in the cover plate of the rocker arm chamber of the housing. A second roller is preferably also mounted on the pin to engage a slot in the rocker arm and both rollers may have their contact surfaces curved transversely.

Figure 11:
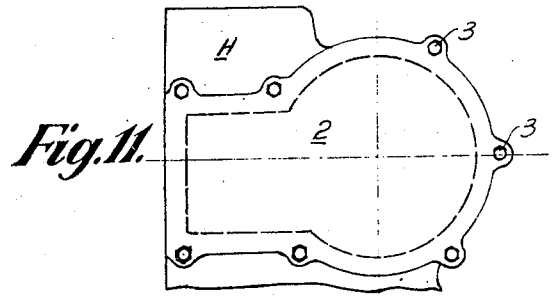
Figure 12:
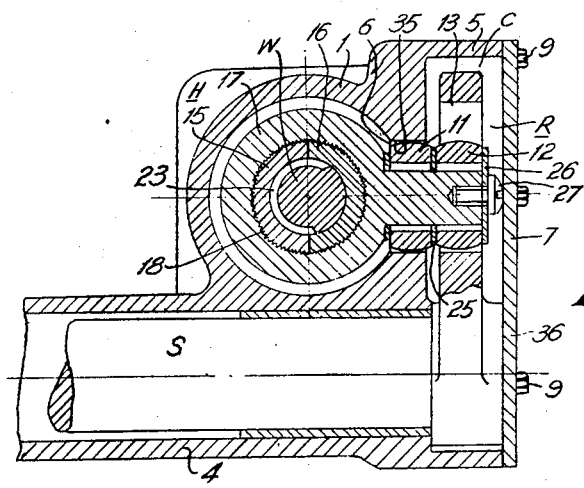

The invention is illustrated in the accompanying drawings in which Figure 1 is a view in elevation of a steering gear and housing constructed in accordance with the invention, Figure 2 being a transverse view of the same with the rocker arm in its normal or head-on position. Figure 3 is a sectional view, but showing the rocker arm displaced and in a position corresponding to that indicated by the dot and peck lines 3—3 of Figure 1. Figure 4 is a part end view of the housing. Figure 5 is a horizontal sectional plan view illustrating the nut. Figures 6 and 7 are respectively part transverse and longitudinal sections showing further details of construction. Figure 8 is a view in elevation of the steering housing showing an alternative shape of guideway, and Figure 9 is an end view thereof. Figures 10, 11 and 12 are respectively an elevation, transverse section and end view illustrating another embodiment of the invention.

Referring to the drawings, A indicates generally a tubular steering column having a steering rod or shaft B axially mounted therein and the whole being enclosed within a housing indicated generally at H, including a rocker arm chamber C. Attached to the upper end of the steering column A is the steering wheel (not shown), the shaft B being supported in one or more suitable thrust and radial bearing (not shown). On the lower end of shaft B is a worm W of uniform pitch for co-operation with a nut N by means of which steering motion is transmitted to a rocker arm R fast on a shaft S by means of which steering motion is transmitted to the road wheels.

It will be observed that the housing H includes a tubular portion 1 closed at its lower end by a plate 2 secured thereto by studs 3. Extending at right angles to the cylindrical housing 1 is a cylindrical or tubular portion 4 in which the shaft S is mounted. On one face of the housing H is a segmental flange 5 enclosing the rocker chamber C which opens through slot 6 into the interior of the tubular portion 1 and into which the tubular portion 4 extends. The rocker chamber C is provided with a cover plate 7 which is complementary in shape to the recess so as to fit snugly therein, being located by a flange 8 and held by screw studs 9.

The nut N carries a laterally projecting pin 10 and on pin 10 are two ring shaped contact elements or guide rollers 11, 12 adapted to co-operate respectively with a slot 13 in the rocker arm R and a guide-way in the form of a longitudinal recess 14 (Figures 1-5) formed in the cover plate, which recess 14 extends parallel with the axis of the steering column.

In this embodiment of my invention it is to be observed that the rollers 11 and 12 are formed with curved contact surfaces so as to give a linear contact respectively with the slot and guideway.

In the embodiment illustrated the nut N is constituted by two half sections 15, 16 which are secured to the pin 10 by means of a cylindrical member 17 surrounding the nut and with which the pin 10 is integral. The outer surface of each nut section 15, 16 is provided with longitudinally extending grooves 18 which engage with corresponding grooves in the inner wall of the cylindrical member 17.

It will thus be seen that the half portions 15, 16 of the nut N may be moved longitudinally relative to each other. In order properly to align such nut portions with respect to each other and to fix them against longitudinal movement with respect to the member 17, end plates 19 (Figure 5) having central openings therein, through which the worm W extends, are removably secured by set screws 20 to the ends of member 17 by threading the periphery thereof into threaded openings 18. The end plates 19 may be provided with transverse grooves 21 for the reception of a suitable turning tool so that such end plates may be readily applied or removed.

In order to provide for the proper positioning of the half nut portions 15, 16 with respect to each other, two-piece (split) ring shaped washers 22, 23 are interposed at each end between the end plates 19 and the nut portions 15, 16. The split washers 22, 23, it will be noted, are of different thicknesses so that when parts are initially assembled both of the thicker washers 22 are disposed at one end of the nut N and both of the thinner washers 23 are disposed at the opposite end thereof.

In manufacture, after assembly of the parts of the nut element just described, the two solid half portions 15, 16 are bored and tapped to a pitch and helix in agreement with the worm W.

In the event of wear, such wear may be taken up by interchanging one of the thinner washers 23 with its corresponding thicker washer 22 for that half portion of nut N.

The rollers 11 and 12 are mounted on the pin 10 by means of roller bearings 24 and are separated from each other by a washer 25 so that each may rotate independently of one another, the two elements 11, 12 being secured to the pin 10 by a disc 26 and fixing stud 27.

In the embodiment illustrated in Figures 1–3, the guide-way in the rocker chamber cover plate is of uniform curvature on a curvature having a radius greater than any effective radius chosen on the lever arm R and is so positioned that its medial point is located on the centre line of the worm W. The guideway curves in both directions away from the medial point in a uniform curve and terminates adjacent the sides of the chamber formed by flange 5.

In operation of the structure above described, when the steering wheel and the road wheels are in their straight ahead or head-on position, the nut N, the pin 10 and the rocker arm R are in the position shown in Figures 1 and 2. As worm W is turned in either direction, the nut N is confined against turning movement through engagement of the guide roller 12 with the guideway 14 and so the nut N will thereby be caused to move longitudinally of the worm W. The guide roller 12 then moves along the guideway 14 and roller 11 engages with the sides of the slot 13, the roller 11 will cause the rocker arm R to rock, thereby turning the shaft S and turning the wheels correspondingly.

Since the guideway 14 is of uniform curvature, as the roller 12 moves therealong the effective radius of the rocker arm R due to the contact of the roller 11 with the sides of the guideway 13 increases since the curvature of the guideway 14 is on a radius greater than the curvature of an arc defined by any point in the rocker arm R as it turns about its pivot shaft S.

As the pin 10 moves from its central position toward either end of the guideway 14, the pin 10 is slightly cocked, as illustrated in Figure 3, and the rounded peripheral surfaces of the rollers 11, 12 will be in point engagement with the walls of their respective guideways so that jamming will not occur.

It is not essential that the pin 10 should be positioned at right angles to the guideway 14 in the medial position or head-on driving position of the wheels. It can be cocked within limits as in Figure 3 or in the opposite direction thereto depending upon the leverage selected for the rocker arm R most suitable in that position for the vehicle selected. Indeed one of the prime objects of the invention described is to be able to select a wide range of possible mechanical ratios between the steering wheel and the road wheels by merely removing the cover plate 7 and replacing it by another having a differently formed guideway 14 without alteration of the other elements of the mechanism.

Figure 8 shows a modified form of the present invention in which the structure is substantially the same as in the embodiment above described except that a guideway 30 is provided in the cover plate 7, which corresponds to the guideway 14 above described but is of a different shape. The guideway 30 is formed with a curved central portion 31 which terminates in uniform portions 32 at both ends thereof. A pre-determined different action, than in the structure above described, will thereby result from the present structure in that upon turning the worm W and moving the nut N from its initial medial position, the roller 12 first runs along the curved portion 31, of a pre-determined radius, and is then guided on a course more nearly axial of the worm W. The effect is to further increase the number of turns required at the steering wheel to impart a given angular movement to the rocker arm R, since the point of contact of the roller 11 with the sides of slot 13 would move outwardly from the shaft S. Very considerable variations in steering ratios can be obtained in this manner.

For a given longitudinal displacement of the nut N the shaft S would be turned at a faster rate at this initial stage of turning than at the later stages of turning when the roller 12 engages the portions 32 of the guideway 14.

Similarly when the nut N is constrained to rock on the worm W by virtue of the curvature of the guideway 14 such movement will be in a coincident direction with the worm W on one extreme lock and non-coincident on the opposite lock, depending upon whether the worm thread is right or left hand. This causes some variation in the effort required at the steering wheel on known steering gears. The present invention permits a correction to be made in the geometry of the guideway 14.

A further course for the guide slot is plotted in Figure 8A. The effect is a more direct ratio at centre ahead, a less direct ratio towards halfway of each lock and a corrected extreme lock ratio to avoid too many turns on steering wheel. These extreme curves need not both be on identical radii.

It will be evident from the above description that predetermined desired variations in the rates of movement of the ground wheels with respect to the turning of the steering wheel may be obtained in a simple way by the above described embodiments by varying the shape of the guideways 14 and 30. Such guideways may be provided in the cover plate 7 and may be given practically any desired curvature. Since such plates are economical to construct and assemble it will be evident that one may obtain practically any desired steering results at very little cost and a wide measure of manufacturing standardisation.

Figures 11 and 12 show another modified form of the present invention in which a guide slot 35 for roller 12 is not a part of the cover plate 7, as in the embodiments above described, but is formed in the casting of the housing H. Modern cast materials exist which permit surfaces to be locally hardened hence this guideway can form part of the cast ferrous material or a shaped separately hardened part can be inserted to form the guideway, if hardening be desirable. The guideway is formed by leaving sufficient material in the casting to form a runway of adequate width at opening 6. By suitably machining the surfaces at the opening, the guideway may be given practically any desired form.

A flat end or cover plate 36 is fixed to the flange 5 of the housing H and the rocker arm R is disposed within the space defined by the flange 5 and the end plate 36.

In any of the above described embodiments of the invention the contact rollers 11, 12 may require to be of different diameters, with the guideways suitably dimensioned to avoid interference when the pin 10 is in a cocked or inclined position or they may be of uniform size depending upon the parts.

Whilst the invention has been described above more specifically in connection with steering gear mechanism it will be understood that the invention is applicable to other mechanisms in which it is desired to convert rotary movement into a linear movement or vice versa.

It will also be understood that various modifications may be made in the details of construction without departing from the scope of the invention. For example, the slot in the rocker arm need not necessarily be straight but may be curved or inclined in one direction or the other, in relation to its vertical axis.

Thus in order to reduce wear between the driving pin on the nut and in the driven rocker arm, I may interpose a suitable bushing either of sintered moulded metal or a solid separate bearing element.

According to a further feature of the invention, the connection between the nut and the lever arm actuated thereby or vice versa is by means of a ball and socket joint, one component of which is formed in or carried by a block slidably mounted in the rocker arm and the other component by the nut.

In one construction in accordance with the invention, the nut is provided with a pin having a spherical portion with an extension entering a groove in the end plate of the housing as described in my Patent No. 2,355,364. This extension may be cylindrical or terminate in a spherical head of smaller diameter than the first mentioned partial sphere. Mounted on the larger spherical portion of the pin is a bush with a corresponding internal spherical surface, the bush being a sliding fit in the slot of the rocker arm. Preferably the interengaging faces of the bush and rocker arm are radiused.

On the head of the actuating pin where this is cylindrical is fitted a roller (with or without anti-friction bearings) machined to fit the groove in the cover plate, the section of the roller being plane or curved. In the event that the head be radiused, then split slippers may be fitted or part of a sphere with partial spherical bore to form the roller.

In the cover plate is fitted a thrust screw and locking means so that by turning the screw, the said shaft and its arm will be pressed towards the nut thus compressing the spherical shaped slot of the arm against the outer convex shape of the bushing which, in turn, would have its inner concave shape pressed against the larger partial sphere on the pin. The bushing, being of softer material than the rocker arm or nut pin, will thus show the most rapid wear and can be replaced at small cost.

Furthermore, the adjustment device of this invention permits a greater spread of manufacturing tolerances throughout the mechanism such as the general fit of the ball bearing screw and nut, the spherical pin dimensions and the dimensions of the rocker arm slot so enabling all objectionable back lash to be eliminated both on assembly and in subsequent operation.

Figure 13:
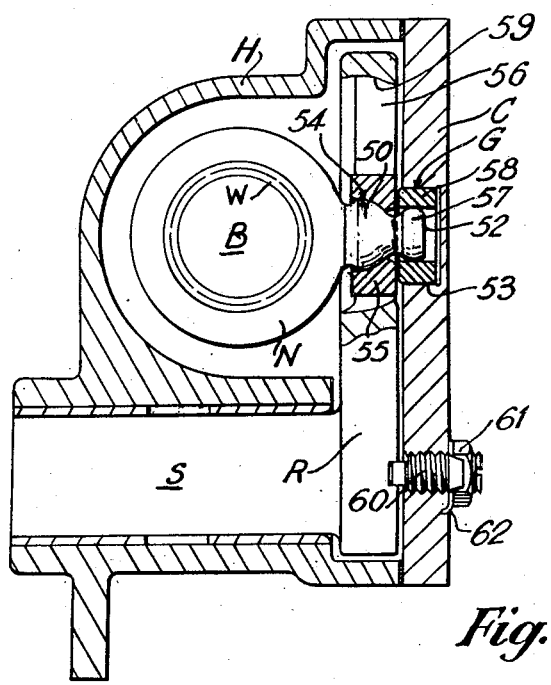
Figure 14:
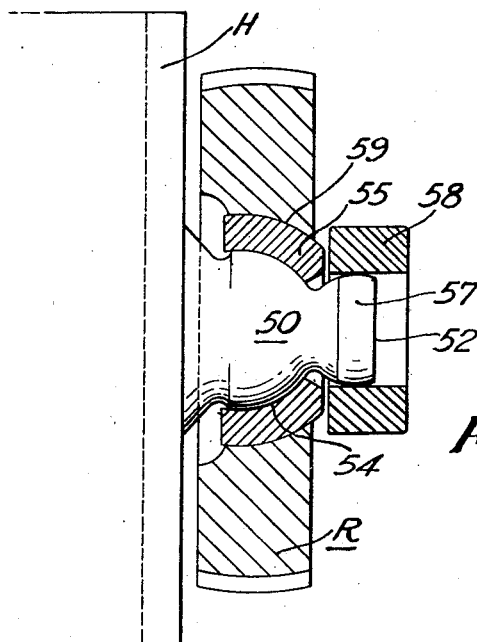
Figure 15:
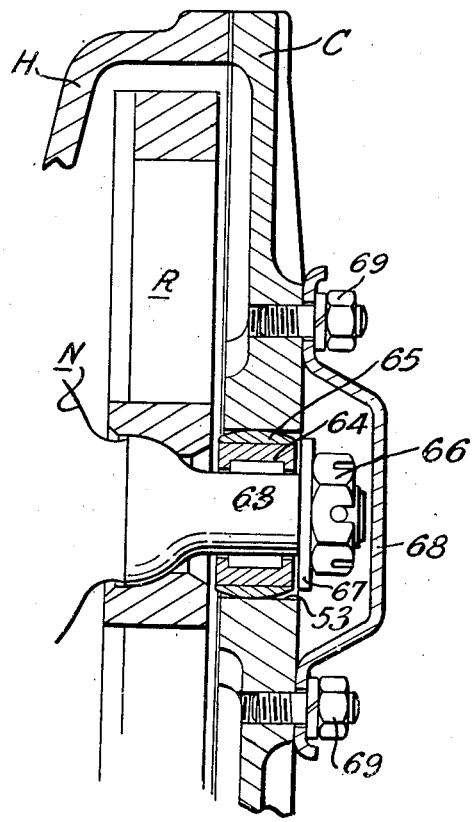

Figures 13-15 of the accompanying drawings illustrate two forms of connection. Figure 13 is a transverse sectional view of a steering gear and housing incorporating an improved worm and nut drive in accordance with the invention. Figure 14, is a sectional plan on an enlarged scale of the ball and socket joint. Figure 15 is a sectional view of another design of ball and socket joint, part of the housing, the worm and nut transmission being omitted.

Referring now to Figures 13 and 14, according to this invention, the connecting pin between the nut N and the lever arm actuated thereby, comprises a ball and socket joint, the nut N in the construction shown being formed with an integral pin 50 formed at its outer end with an extension 52 for co-operation with a guide slot 53 in the cover plate C.

On the pin 50, a spherical surface 54 which mates with a corresponding surface formed in a bush 55, the bush 55 being slidable in a radial slot 56 formed in the rocker arm R.

In the construction shown in Figure 14, the interengaging surfaces of the bush 55 and slot 56 are radiused as can be seen at 59. The extension 52 is similarly formed with spherical head 57, but of smaller diameter than the first-mentioned partial sphere and on this spherical head, is fitted a roller 58 to fit the groove G in the cover plate C. The section of the roller may be plain or grooved, but where the head 57 is reduced thin slippers may be fitted or a part of a sphere with partial spherical bore to form the roller.

In order to take up any adjustment that may be required the cover plate C is provided with a thrust screw 60 and lock nut 61 with lock washer 62 so that by turning the screw, the shaft S together with its radius arm R may be pressed in the direction of the nut thus pressing the spherical-shaped slot of the arm against the outer convex of the bush, which in turn would have its inner concave shape pressed against the larger sphere on the peg. In practice, the bushing 55 is constructed of softer metal than the rocker arm or pin, so that it will receive more rapid wear when it can be replaced at comparatively small cost.

Referring now to Figure 15, the pin 51, it will be noted is formed with a cylindrical extension 63 on which is mounted a roller 64 which may be of bronze supporting a steel annulus 65 to engage the groove 53 in the cover plate. The parts 65 and 64 are secured in position on 63 by means of a nut 66 and washer 67. This construction has the advantage that besides reducing manufacturing costs, any wear can be taken up between the groove in the cover plate and the extension, by replacement of the bronze bush. An inspection cover 68 secured by nuts 69 may be provided so as to permit of inspection of the groove and roller and also of the bush without the necessity of removing the entire cover plate. Obviously instead of a bronze roller 64, the complete nut may be made of hardened steel.

A further difficulty experienced in the manufacture of a full circle ball bearing screw and nut assembly, occurs in the grinding of the helical grooves in the nut when the lead or pitch of the screw thread exceeds a given helix angle in relation to the inner diameter of the nut. To overcome this difficulty it might be necessary to increase the diameter of the screw and nut assembly, thus reducing te helix angle of the thread. Such an increase may, in turn, give rise to difficulties where a driven shaft, for example, as in a steering gear rocker shaft, has to pass under the nut. It may arise that little or no housing metal is left for the interposition of a bearing element for the shaft.

This difficulty is overcome according to a further feature of the invention by reversing the direction of the shaft on its rocker arm and mounting it so that the rocker arm only is contained within the main housing chamber and the rocker shaft does not pass under the nut.

In such an arrangement, in order to provide for the adjustment of the above described bearing elements, the shaft may be mounted in a bushing which itself is adjustable in relation to its housing extension so that by displacing the bushing inwards towards the screw and nut, pressure is exerted between the end of the bushing and the rocker shaft collar thus pushing the rocker arm towards the nut spherical pin. The bushing may be formed with an externally accessible hexagon, and locking means, to permit of the necessary adjustments. Alternatively, adjustment of the rocker shaft may be by means of a screwed pin passing through the cover plate with suitable locking means and suitably engaging the internal end of the rocker shaft (or an extension thereon) rotation of the screw exerting a pull on the shaft.

In both the last described arrangements, the cover plate of the gear housing carrying the guiding channel or slot, may be conveniently located on the opposite side to that previously described and also serve to locate the screw pin referred to. In such a construction, the nut may be arranged to carry a partially spherical head only, on the one side, and the cylindrical or spherical headed pin to carry the rolling element for engagement with the guiding channel or slot would be carried on the opposite side of the nut.

The foregoing invention is particularly adapted for use with the ball-nut type of gear which is the subject matter of my prior application, U.S. Serial No. 707,918 (British No. 1835/46).

What I claim is:

1. In a steering gear mechanism, a worm, a nut threaded on said worm, a shank on said nut, a housing element within which said worm, nut, and shank are disposed, said housing having one wall thereof constructed to form a curved guideway, a contact element mounted on said shank and operatively engaging the walls of said curved guideway, a steering rocker arm having a guideway therein, and another contact element mounted on said shank engaging said last named guideway.

2. In a steering gear mechanism, a worm, a nut threaded on said worm, a shank on said nut, a housing element within which said worm, nut, and shank are disposed, said housing having one wall thereof constructed to form a curved guideway, a ring-shaped contact element mounted on said shank and having the peripheral surface thereof transversely rounded and operatively engaging the walls of said curved guideway, a steering rocker arm having a guideway therein, and another ring-shaped contact element mounted on said shank having the peripheral surface thereof transversely rounded and engaging said last named guideway.

3. In a steering gear mechanism, a worm, a nut threaded on said worm, a shank on said nut, a housing element within which said worm, nut, and shank are disposed, said housing having one wall thereof constructed to form a guideway of uniform curvature, a contact element mounted on said shank and operatively engaging the walls of said curved guideway, a steering rocker arm having a guideway therein, said another guideway being substantially normal to said curved guideway, and another contact element mounted on said shank engaging said last named guideway.

4. In a steering gear mechanism, a worm, a nut threaded on said worm, a shank on said nut, a housing element within which said worm, nut, and shank are disposed, said housing having one wall thereof constructed to form a guideway, said guideway having a substantially straight central portion and terminating in uniformly curved end portions, a contact element mounted on said shank and engaging the walls of said guideway, a steering rocker arm having a guideway therein, said last named guideway being disposed substantially normal to said first named guideway, another contact element mounted on said shank engaging said last named guideway.

ALFRED PAUL MILL.

REFERENCES CITED

The following references are of record in the file of this patent:

UNITED STATES PATENTS

| Number | Name | Date |
|---|---|---|
| 1,893,764 | Douglas | Jan. 10, 1933 |
| 2,388,038 | Briggs et al. | Oct. 30, 1945 |

FOREIGN PATENTS

| Number | Country | Date |
|---|---|---|
| 99,349 | Germany | Sept. 11, 1897 |
| 605,481 | Germany | Mar. 31, 1932 |
| 502,745 | Great Britain | Mar. 24, 1939 |
| 526,010 | Great Britain | Sept. 9, 1942 |